United States Patent
Hemachandran

(10) Patent No.: US 10,565,173 B2
(45) Date of Patent: Feb. 18, 2020

(54) METHOD AND SYSTEM FOR ASSESSING QUALITY OF INCREMENTAL HETEROGENEOUS DATA

(71) Applicant: WIPRO LIMITED, Bangalore (IN)

(72) Inventor: Bharath Kumar Hemachandran, Bangalore (IN)

(73) Assignee: Wipro Limited, Bangalore (IN)

( * ) Notice: Subject to any disclaimer, the term of this patent is extended or adjusted under 35 U.S.C. 154(b) by 368 days.

(21) Appl. No.: 15/470,164

(22) Filed: Mar. 27, 2017

(65) Prior Publication Data

US 2018/0232407 A1    Aug. 16, 2018

(30) Foreign Application Priority Data

Feb. 10, 2017  (IN) .............................. 201741004903

(51) Int. Cl.
*G06F 16/00* (2019.01)
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
CPC .... G06F 16/215; G06F 16/2365; G06F 11/08; G06F 11/14
See application file for complete search history.

(56) References Cited

U.S. PATENT DOCUMENTS

| | | | |
|---|---|---|---|
| 6,631,365 B1 | 10/2003 | Neal et al. | |
| 7,890,509 B1 * | 2/2011 | Pearcy | G06Q 10/06 707/736 |
| 8,117,085 B1 * | 2/2012 | Smith | G06Q 30/0629 705/26.7 |
| 8,984,360 B2 | 3/2015 | Al Za'Noun et al. | |
| 9,092,468 B2 | 7/2015 | Nelke et al. | |
| 9,152,662 B2 | 10/2015 | Bhide et al. | |
| 9,459,843 B1 * | 10/2016 | Smith | G06F 8/315 |
| 9,678,981 B1 * | 6/2017 | Taylor | G06F 16/122 |
| 2005/0102325 A1 * | 5/2005 | Gould | G06F 16/252 |

(Continued)

OTHER PUBLICATIONS

Batini Carlo et al., "A Data Quality Methodology for Heterogeneous Data", *IJDMS*, vol. 3, No. 1, Feb. 2011, pp. 60-79.

*Primary Examiner* — Noosha Arjomandi
(74) *Attorney, Agent, or Firm* — Finnegan, Henderson, Farabow, Garrett & Dunner, LLP

(57) ABSTRACT

The present disclosure relates to a method and system for assessing quality of incremental heterogeneous data by a data quality assessing system. The data quality assessing system determines an incremental heterogeneous data from at least one data source, obtains details associated with the incremental heterogeneous data from the at least one data source, identifies type of the incremental heterogeneous data based on the details and pattern templates, selects one or more data quality tests from a plurality of data quality tests for the incremental heterogeneous data based on the identified type of the incremental heterogeneous data and determines a score for the incremental heterogeneous data based on the one or more data quality tests and user defined parameters to assess quality of heterogeneous incremental data.

21 Claims, 5 Drawing Sheets

(56) References Cited

U.S. PATENT DOCUMENTS

| | | | |
|---|---|---|---|
| 2007/0146380 A1* | 6/2007 | Nystad | H04N 19/43 345/582 |
| 2008/0285381 A1* | 11/2008 | Moldoveanu | G01V 1/3808 367/20 |
| 2010/0153331 A1* | 6/2010 | Baek | G06F 16/40 707/602 |
| 2012/0150820 A1* | 6/2012 | Sankaranarayanan | G06F 16/215 707/690 |
| 2012/0330911 A1 | 12/2012 | Gruenheid et al. | |
| 2014/0006354 A1* | 1/2014 | Parkison | G06F 3/0611 707/649 |
| 2014/0006357 A1* | 1/2014 | Davis | G06F 11/1464 707/667 |
| 2014/0347389 A1* | 11/2014 | Kobayashi | G06T 3/40 345/629 |
| 2014/0379667 A1 | 12/2014 | Hollifield et al. | |
| 2015/0263963 A1* | 9/2015 | Minakuchi | H04L 47/34 370/392 |
| 2015/0347493 A1* | 12/2015 | Namkoong | G11B 20/18 707/691 |
| 2016/0223704 A1* | 8/2016 | Donderici | G01V 3/38 |
| 2016/0246838 A1* | 8/2016 | Li | G06F 11/3672 |
| 2017/0053064 A1* | 2/2017 | Bhavani | G06Q 50/22 |
| 2017/0054410 A1* | 2/2017 | Chen | H02S 50/00 |
| 2017/0371024 A1* | 12/2017 | Ivanov | G01S 5/0252 |
| 2018/0113898 A1* | 4/2018 | Hall | G06F 16/215 |

\* cited by examiner

METHOD AND SYSTEM FOR ASSESSING QUALITY OF INCREMENTAL HETEROGENEOUS DATA

TECHNICAL FIELD

The present subject matter is related in general to the assessing data quality, more particularly, but not exclusively, to a method and system for assessing quality of incremental heterogeneous data.

BACKGROUND

In recent years, a large amount of data is accumulated by organisations at different levels. With an ever increase in data, and due to digital transformation and adoption of Internet Of Things (IOT), Social Media, Analytics and Cloud (SMAC) technologies, most of the organisations are trending towards consolidation of data from various data sources such as, real-time and batch data sources etc., into other singular stores. In today's digital period, data acquisition is done from various sources of data such as, databases or live feeds or click stream data. The data acquired is stored in its native form in a storage repository or data lake. The data lake has the potential to transform business by providing a singular repository for all the types of data such as, structured and unstructured data and internal and external data etc. Availability of such singular repository may enable business analysts and data science team to mine and exploit all the data that is scattered across a multitude of operational systems, data warehouses, data marts. However, integration of different types of data sources efficiently is a troublesome and extremely error prone and challenging process today. Often organizations employ only basic or even no checks to ensure that the quality of data is in good upstream.

Existing technologies perform data acquisition and data quality monitoring on structured data or data from relational databases which may be sequential and the quality can be assessed by normalizing the data. However, data acquisitions cannot be performed on heterogeneous data source when type, nature, structure etc., of data is not known. For example, the existing techniques do not work when large volume of data streams received, contain a mixture of structured data, semi-structured data, quasi-structured data and unstructured data. Also, most of the data quality measuring methods in the existing scenario focus only on structured database or relational database. Often the root-cause analysis is performed only when bad results are discovered. This technique is extremely expensive, cumbersome or even impossible given the volume and speed with which data is pushed into data lakes.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for assessing quality of incremental heterogeneous data. The method comprises determining an incremental heterogeneous data from at least one data source, obtaining details associated with the incremental heterogeneous data from the at least one data source, identifying type of the incremental heterogeneous data based on the details and pattern templates, selecting one or more data quality tests from a plurality of data quality tests for the incremental heterogeneous data based on the identified type of the incremental heterogeneous data and determining a score for the incremental heterogeneous data based on the one or more data quality tests and user defined parameters to assess quality of heterogeneous incremental data.

In an embodiment, the present disclosure relates to a data quality assessing system for assessing quality of incremental heterogeneous data. The data quality assessing system comprises a processor and a memory communicatively coupled to the processor, wherein the memory stores processor executable instructions, which, on execution, may cause the data quality assessing system to determine an incremental heterogeneous data from at least one data source, obtain details associated with the incremental heterogeneous data from the at least one data source, identify type of the incremental heterogeneous data based on the details and pattern templates, select one or more data quality tests from a plurality of data quality tests for the incremental heterogeneous data based on the identified type of the incremental heterogeneous data and determine a score for the incremental heterogeneous data based on the one or more data quality tests and user defined parameters to assess quality of heterogeneous incremental data.

In an embodiment, the present disclosure relates to a non-transitory computer readable medium including instructions stored thereon that when processed by at least one processor may cause a data quality assessing system to determine an incremental heterogeneous data from at least one data source, obtain details associated with the incremental heterogeneous data from the at least one data source, identify type of the incremental heterogeneous data based on the details and pattern templates, select one or more data quality tests from a plurality of data quality tests for the incremental heterogeneous data based on the identified type of the incremental heterogeneous data and determine a score for the incremental heterogeneous data based on the one or more data quality tests and user defined parameters to assess quality of heterogeneous incremental data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
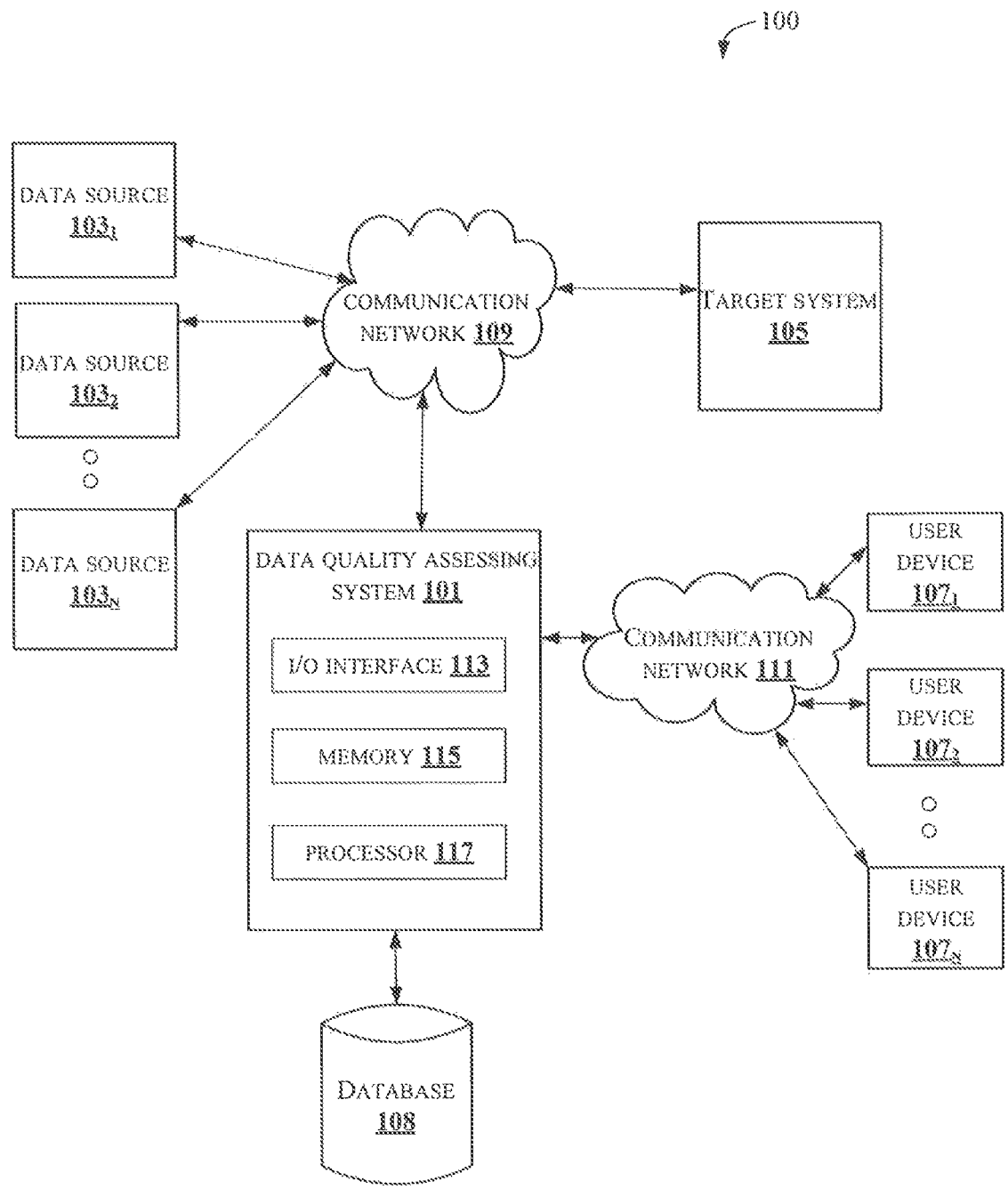
FIG. 1 illustrates an exemplary environment for assessing quality of incremental heterogeneous data in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a data quality assessing system for assessing quality of incremental heterogeneous data. In some embodiments, the incremental heterogeneous data comprises diverse data types and may be obtained from diverse data sources. In order to provide a single repository for different types of data, the data from a plurality of data sources is acquired and stored at a single repository or a target system. Whenever a data transfer from at least one data source takes place, the data quality assessing system determines similarity between the data present at least at one data source with corresponding data transferred to the target system. The incremental heterogeneous data is determined from the data from at least one data source in case of a dissimilarity between the data at the at least one data source and the corresponding data at the target system. In some embodiments, type of incremental heterogeneous data may comprise at least structured data, semi-structured data, quasi-structured and unstructured data. Based on details of the incremental heterogeneous data obtained from the at least one data source and pattern templates, the data quality assessing system determines the type of the incremental heterogeneous data. In some embodiments, users may provide training data indicating patterns for determining type of the incremental heterogeneous data. The pattern templates are generated automatically by analyzing the user defined patterns. The quality of the incremental heterogeneous data is assessed by determining a score for the incremental heterogeneous data based on one or more data quality tests and user defined parameters. The one or more data quality tests are selected from a plurality of data quality tests based on the identified type of the incremental heterogeneous data for testing the incremental heterogeneous data. In some embodiments, a scoreboard is generated representing the quality of the incremental data based on the score. The present disclosure helps in assessing the quality of data from all types of data sources and for all types of data in a convenient manner.

FIG. 1 illustrates an exemplary environment for assessing quality of incremental heterogeneous data in accordance with some embodiments of the present disclosure.

As shown in FIG. 1, the environment 100 comprises a data quality assessing system 101 connected through a communication network 109 to a data source $103_1$, a data source $103_2$, . . . and a data source $103_N$ (collectively referred as plurality of data sources 103) and a target system 105. In some embodiments, the plurality of data sources 103 may include, but are not limited to, a database, data centers of various social media, data warehouses, data marts, operational systems, text files etc. Further, the plurality of data sources 103 and the target system 105 is connected through the communication network 109, In some embodiments, the data in the plurality of data sources 103 may comprise batch and real-time data. In some embodiments, the data quality assessing system 101 may include, but are not limited to, a laptop, a desktop computer, a Personal Digital Assistant (PDA), a notebook, a smartphone, a tablet and any other computing devices. The target system 105 is a repository for storing different types of data. In some embodiments, the data stored in the target system 105 is used by business analysts and data science team to mine and exploit all the data which is taken from the plurality of data sources 103. The data from at least one data source of the plurality of data sources 103 may be transferred to the target system 105. The data quality assessing system 101 compares the data present in least at one data source with corresponding data at the target system 105 and determines the presence of incremental heterogeneous data based on dissimilarity between the data present in at least one data source and the target system 105. The data quality assessing system 101 assesses the quality of the determined incremental heterogeneous data. In some embodiments, the incremental heterogeneous data may comprise diverse data types. In some embodiments, the incremental heterogeneous data may be obtained from diverse data sources. Further the data quality assessing system 101 is connected to a user device $107_1$, a user device $107_2$, . . . and a user device $107_N$ (collectively referred as plurality of user devices 107). In some embodiments, the plurality of user devices 107 may include, but are not limited to, a laptop, a desktop computer, a Personal Digital Assistant (PDA), a notebook, a smartphone, a tablet and any other computing devices. The data quality assessing system 101 is also connected to a database 108. Further, on determining incremental heterogeneous data from at least one data source of the plurality of data sources 103, the data quality assessing system 101 obtains details associated with the incremental heterogeneous data. The type of the incremental heterogeneous data is determined based on the details of the incremental heterogeneous data and the pattern templates. In some embodiment, the type of the incremental heterogeneous data may comprise structured data, semi-structured data, quasi-structured data and unstructured data. A person skilled in the art would understand that the incremental heterogeneous data may also include any other type of data not explicitly mentioned in the present disclosure. In some embodiments, the data quality assessing system 101 receives user defined patterns from the plurality of user devices 107. The data quality assessing system 101 automatically generates pattern templates for identifying the type of the incremental heterogeneous data by analyzing the user defined patterns. The database 108 stores the user defined patterns and the automatically generated pattern templates for the incremental heterogeneous data. In some embodiments, the data stored in the database 108 may be stored in the memory of the data quality accessing system 101. Once the type of the incremental heterogeneous data is identified, the incremental heterogeneous data is tested using one or more data quality tests. The one or more data quality tests are selected from the plurality of the data quality tests based on the type of the incremental heterogeneous data. In some embodiments, the plurality of data quality tests comprises accessibility of source check, consistency check, timeliness check, validity check, accuracy check and non-duplicity check. A person skilled in the art would understand that the data quality tests may also include any other type of tests not explicitly mentioned in the present disclosure. Based on the one or more data quality tests and user defined parameters, the data quality assessing system 101 determines a score for the incremental heterogeneous data. In some embodiments, the user defined parameters comprise priorities for data quality ranking, time criteria required for assessing the incremental data and frequency of pinging the at least one data sources. Further, based on the score, the data quality assessing system 101 generates a scoreboard which depicts the quality of the incremental heterogeneous data.

The data quality assessing system 101 comprises an I/O Interface 113, a memory 115 and a processing unit 117. The I/O interface 113 may be configured to receive the details associated with the incremental heterogeneous data. The I/O interface 113 may also receive user defined patterns and user defined parameters from the plurality of user devices 107.

The received information from the I/O interface 113 is stored in the memory 115. The memory 115 is communicatively coupled to the processing unit 117 of the data quality assessing system 101. The memory 115 also stores processor instructions which cause the processing unit 117 to execute the instructions for assessing quality of the incremental heterogeneous data.

Figure 2:
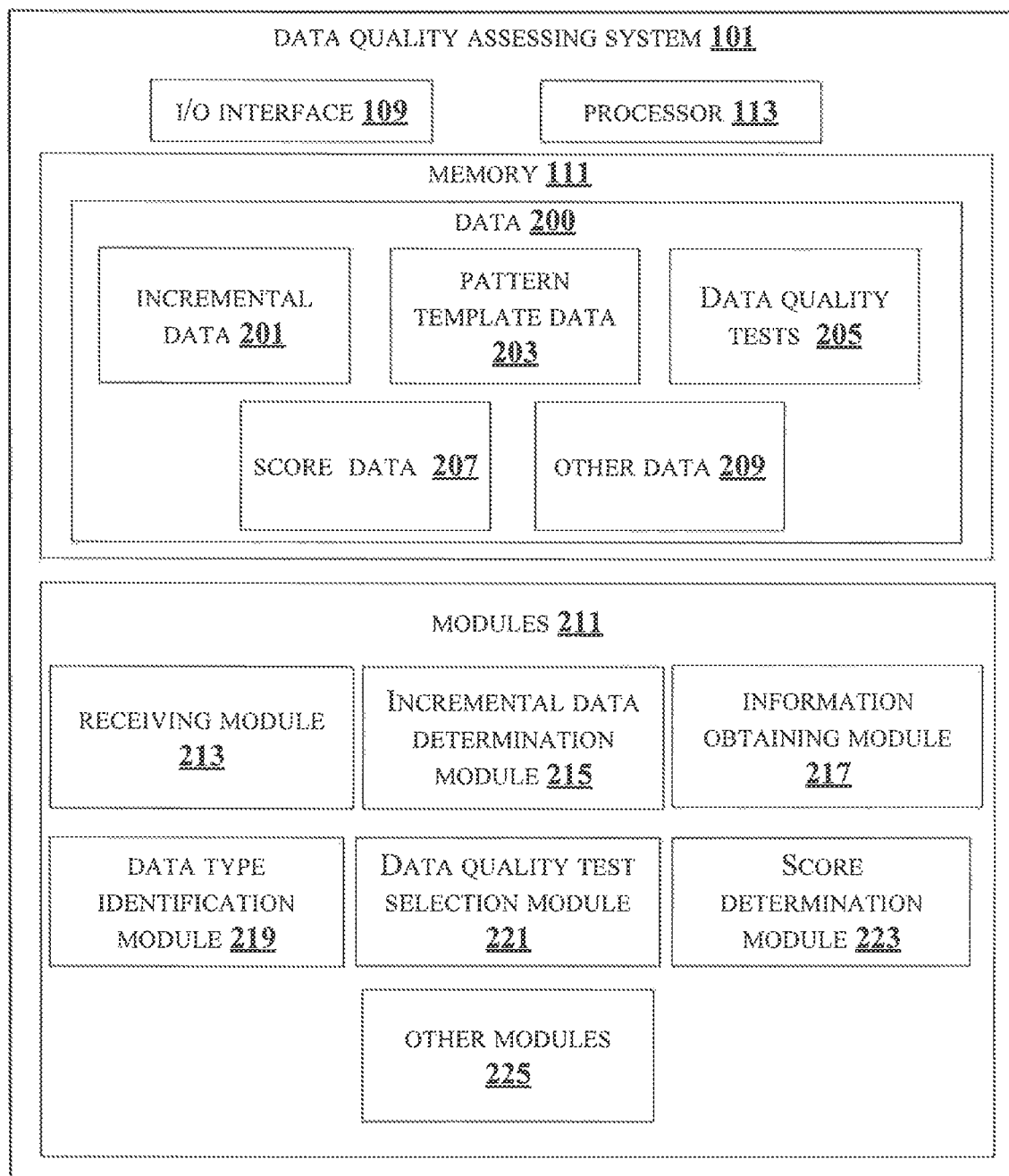
FIG. 2 shows a detailed block diagram of a data quality assessing system in accordance with some embodiments of the present disclosure.

FIG. 2 shows a detailed block diagram of a data quality assessing system in accordance with some embodiments of the present disclosure.

Data 200 and one or more modules 211 of the data quality assessing system 101 are described herein in detail. In an embodiment, the data 200 comprises incremental data 201, pattern template data 203, data quality tests 205, score data 207 and other data 209.

The incremental data 201 comprise details about the incremental heterogeneous data identified from the at least one data source. The incremental heterogeneous data may be identified in case of dissimilarity between the data at the at least one data sources 103 and corresponding data at the target system 105. The incremental data 201 comprises information about the incremental heterogeneous data extracted from at least one data source 103. In some embodiment, the incremental heterogeneous data may comprise structured data, semi-structured data, quasi-structured data and unstructured data. The structured data may comprise, for example, currency data, date related data, tables of relational database data, text files etc. The semi-structured data may comprise for example, data in XML format from different data sources etc. The examples of quasi-structured data are data from browsers, Uniform Resource Locator (URL) and clickstream data etc. The unstructured data comprises for example, audio data, video data, image data etc. A person skilled in the art would understand that the examples mentioned above for the different types of the incremental heterogeneous data are non-limiting in nature.

The pattern template data 203 comprises the pattern templates generated automatically by the data quality assessing system 101 for determining the type of the incremental heterogeneous data. The pattern templates are generated based on the user defined patterns received from the users. The pattern templates are generated by analysing the user defined patterns. In some embodiments, the pattern templates are generated automatically based on machine learning. Generally, the machine learning may be one of supervised learning and unsupervised learning. In an embodiment, the pattern templates are generated initially using supervised learning.

The data quality tests 205 comprises information about the plurality of data quality tests available for assessing the quality of data. In some non-limiting embodiments, the data quality tests comprise accessibility of source check, consistency check, timeliness check, validity check, accuracy check and non-duplicity check. A person skilled in the art would that any other type of data quality tests may be used in the present disclosure. The data quality tests 205 are selected based on the type of the incremental heterogeneous data.

The score data 207 comprises details about the score determined for the incremental heterogeneous data based on the data quality test. The score data 207 comprises a corresponding score for each of the data quality test performed. The score data 207 may be used for generating a scoreboard which may represent the quality of the incremental heterogeneous data.

The other data 209 may store data, including temporary data and temporary files, generated by modules for performing the various functions of the data quality assessing module 101.

In an embodiment, the data 200 in the memory 115 are processed by the one or more modules 211 of the data quality assessing system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

In one implementation, the one or more modules 211 may include, but are not limited to, a receiving module 213, an incremental data determination module 215, an information obtaining module 217, a data type identification module 219, a data quality test selection module 221 and a score determination module 223. The one or more modules 211 may also comprise other modules 225 to perform various miscellaneous functionalities of the data quality assessing system 101. It will be appreciated that such modules may be represented as a single module or a combination of different modules.

The receiving module 213 may receive the data from at least one data source for transferring to the target system 105. In some embodiment, the data may be streaming data from the at least one data sources. The receiving module 213 may also receive details regarding the incremental heterogeneous data from the at least one data source. Further, the receiving module 213 may also receive user defined patterns and user defined parameters from the plurality of user devices 107.

The incremental data determination module 215 may determine the presence of incremental heterogeneous data. The incremental data determination module 215 compares the data from at least one data sources 103 with the corresponding data at the target system 105. In case, the comparison results in dissimilarity between the data at the at least one data sources and the corresponding data at the target system 105, the incremental data determination module 215 indicates the presence of incremental data. In some embodiments, the incremental data comprises diverse data types. In some embodiments, the incremental heterogeneous data is data from diverse data sources.

The information obtaining module 217 may obtain details associated with the determined incremental heterogeneous data. The information obtaining module 217 determines the details of the incremental heterogeneous data from the at least one data source.

The data type identification module 219 may identify the type of the incremental heterogeneous data. The data type identification module 219 determines the type of the incremental heterogeneous data based on the pattern templates and details associated with the incremental heterogenous data. The data type identification module 219 generates the pattern templates automatically by analysing the pre-defined patterns provided by the users. In some embodiments, the pre-defined patterns are used to train the data quality assessing system 101 for automatically generating the pattern templates. In some embodiments, the data type identification module 219 determines the type of the incremental heterogeneous data as structured data, semi-structured data, quasi-structured data and unstructured data. In some embodiments, the data type identification module 219 assumes the incremental heterogeneous data received to be first as the structured data. Although, the structured data may be recognized easily with the use of delimiters. For example, a stream of data is received and delimiter for the stream data is known, then the number of fields in the stream data may be compared to ensure that each row/record has an equivalent number of columns. In case, the incremental heterogeneous data is recognised as structured data, the next iteration recognizes the data types. For example, all columns with only numbers and nulls are recognized as a number only column etc. For example, if an organization is migrating data related to certain tables, which comprises some set of data types and data patterns such as timestamps. The set number of patterns may be DD/MM/YYYY, HH:MM:SS, DD-MM-YYYY, HH:MM:SS, MM/DD/YYYY or HH:MM:SS. The data type identification module 219 identifies the data type to be structured data based on the data types and patterns. In case the incremental heterogeneous data is not recognised as structured data, the data type identification module 219 assumes the incremental heterogeneous data to be semi-structured data. In some embodiments, there are only a few semi-structured data formats, such as, XML, JSon etc. The data type identification module 219 builds a data structure for the incremental heterogeneous data and checks for any discrepancies based on the data structure. In some embodiments, the users may provide one or more schemas to check for correctness of the data structures of the incremental heterogeneous data. In another example, if the migrated data is XML files, the XML files are taken as a stream of data and converted into data structures to identify and extract data from the data structure. The data type identification module 219 identifies the data type to be semi-structured based on pattern templates such as, XML schema files etc., or based on pre-existing data structures which maps with the identified data structures. In case the incremental heterogeneous data fails to be semi-structured data, the data type identification module 219 checks for quasi-structured data. In some embodiments, the user may provide templates for quasi-structure format as the quasi structure data is not inherently human readable. In some embodiment, the identification of data is performed by unsupervised learning method by using the templates/rules provided by the users. In some embodiments, the data type identification module 219 may flag anomalies to the users, which may be reviewed by the users to check whether the data is junk or not. In some embodiments, the data type identification module 219 identifies the incremental heterogeneous data to be unstructured data based on meta-data of the incremental heterogeneous data.

The data quality test selection module 221 selects one or more data quality tests from the plurality of the data quality tests available. The data quality test selection module 221 selects the one or more data quality tests based on the type of the incremental heterogeneous data. The data quality test selection module 221 selects the one or more data quality tests and performs the selected data quality tests on the incremental heterogeneous data. In some embodiments, the plurality of data quality tests comprises accessibility of source check, consistency check, timeliness check, validity check, accuracy check and non-duplicity check. The accessibility of source check is a test which is configured to check the accessibility of the at least one data source. Further, the accessibility of the at least one data source is determined by periodically pinging the at least one data source at pre-defined intervals of time and checking the connection. The consistency check is a test which is configured to check if the data at the at least one data source 103 and the target system 105 are consistent. In some embodiments, the consistency check is performed by using a comparator and a checksum at the at least one data source 103 and the target system 105. The timeliness check is a test which is configured to evaluate the time criteria provided by the users on the data. The validity check is a test which is configured to check the validity of the data based on the pre-defined business rules. The accuracy check is a test which is configured to check the completeness of the data or accuracy of data by using pre-defined keywords or templates for the data. In some embodiments, the accuracy check may use a search tree to extract pre-defined keywords or templates in data streams with any type of the incremental heterogeneous data such as, structured type, semi-structured type, quasi-structured type and un-structured type. The non-duplicity check is a test which is configured to compare the incremental heterogeneous data to ensure that the multiple copies of the same data does not exists. In some embodiments, the duplicity checks may be performed by using a comparator and search tree to monitor the repetition frequency of specific combination of American Standard Code for Information Interchange (ASCII) character or predefined word templates. For example, timeliness check for structured data ensures that the incremental heterogeneous data coming in meets the data/time range which is required for the structured data. In an embodiment, if the data source is required to produce date/time sensitive details, then all the data that needs to be processed requires to be within the required time range. In another example, during accuracy check for semi-structured data, the data to be transferred to an appropriate location may require check for completeness. In an XML document for example, certain fields represented by tags may be important fields and may need to have data populated (ID of a person for example). In some embodiment, there may be legacy data/incorrect data that may have the tagged field as missing. Ensuring that the appropriate tags are recognized and checked for completeness is an example of the accuracy check. In some embodiment, the data at source needs to be consistent with the data at the destination. Therefore, ensuring consistency between source and destination is an important quality check. This is performed by validating a checksum of the data transferred from a source and corresponding data received at the destination as a quick and accurate method to ensure that the data on both sides is consistent.

The score determination module 223 determines a score for each of the data quality tests selected. The score determination module 223 determines the score for the incremental heterogeneous data based on the one or more data quality tests and user defined parameters. In some embodiments, the user defined parameters comprise priorities for data quality ranking, time criteria required for assessing the incremental data and frequency of pinging the at least one data sources. Further, the score determination module 223 generates a scoreboard using the scores determined for representing the quality of the incremental heterogeneous data. The scoreboard is provided to the users for determining the quality of the incremental heterogeneous data. Below is an example of scores determined for the data quality tests for the incremental heterogeneous data from a particular data source. Consider an example, where data is migrated from a database of an organization to the target system 105. The database comprises tables with employee details. In some embodiments, the total number of records migrated are two million and a good quality index benchmark is identified to be 98%. The number of records which met the provided data/time are identified as 1,900,000 records. The score determination module 223 determines the score for the timeliness check using the below formula:

$$\text{Timeliness Quality Index} = \text{Number of Records that met provided date or time range/Total number of records migrated} \tag{1}$$

$$\text{Timeliness check} = \frac{1,900,000}{2,000,000} = 95\%.$$

Further, the score determination module 223 determines a score for the accessibility check. The score determination module 223 identifies a required time to migrate the data from the database as 24500 seconds and an uptime of the source as 24500 seconds. The score determination module 223 determines the accessibility score using the following formula.

$$\text{Accessibility score} = \text{time required to migrate data from source/uptime of the source} \tag{2}$$

Accessibility score=24500/24500=100%.

The score determination module 223 determines the score for the accuracy check. The records that conform to required business parameters is identified as 1,980,000. The score for the accuracy check is determined by using below formula:

$$\text{Accuracy check} = \text{records that conform to required business parameters/Total number of records migrated} \tag{3}$$

Accuracy check=1,980,000/2,000,000=99%.

The score determination module 223 determines a score for the consistency check by identifying the number of records that match the source. The number of record that matches the source is identified as 2,000,000. The score for the consistency check is determined by using the below formula:

$$\text{Consistency check} = \text{number of records that match the source/number of records migrated} \tag{0.4}$$

Consistency check=2,000,000/2,000,000=100%.

Figure 3:
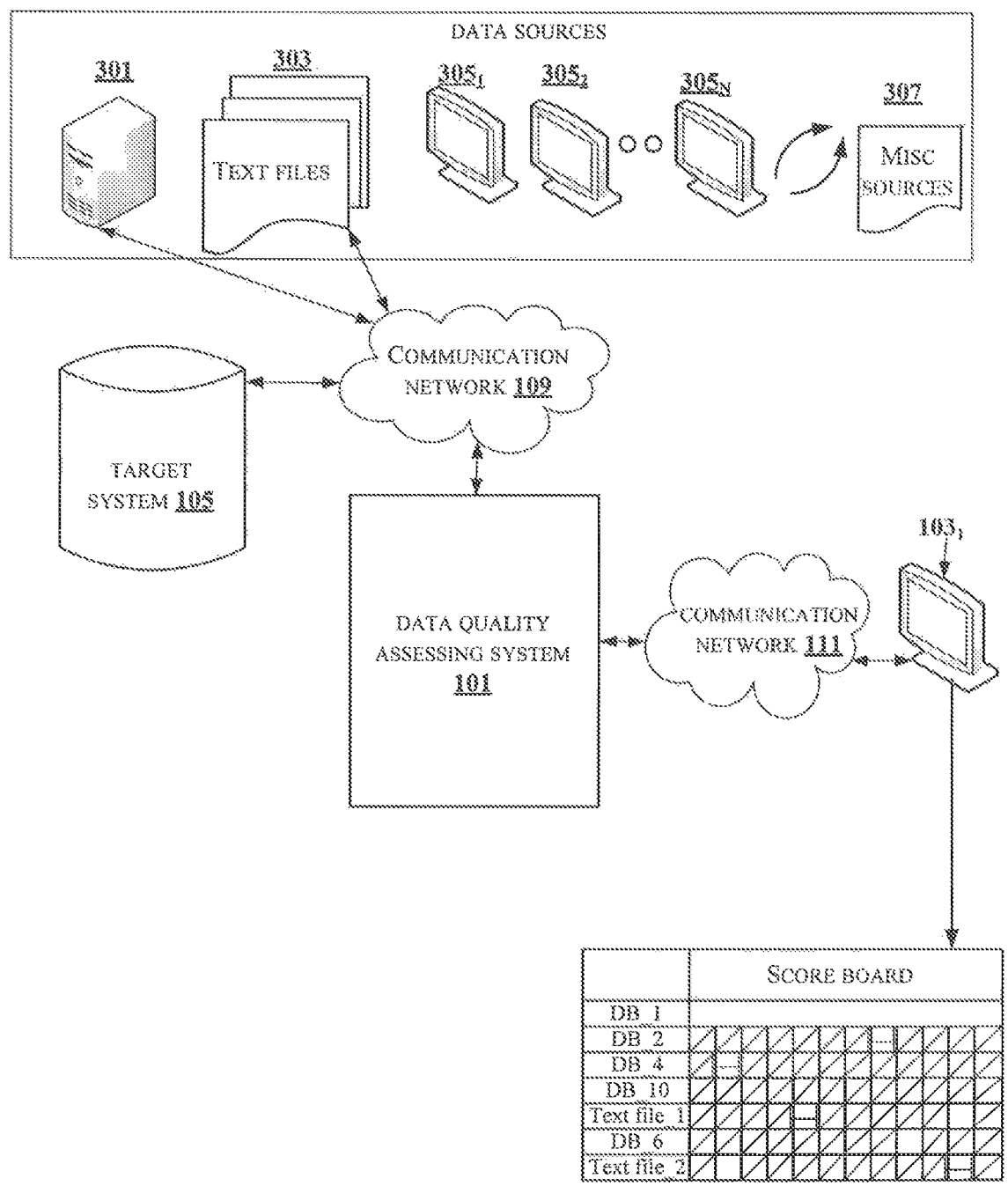
FIG. 3 shows an exemplary representation of assessing quality of incremental heterogeneous data in accordance with some embodiments of the present disclosure.

FIG. 3 shows an exemplary representation of assessing quality of incremental heterogeneous data in accordance with some embodiments of the present disclosure.

As shown in FIG. 3, the environment 300 illustrates a scenario of assessing quality of the incremental heterogeneous data in an exemplary embodiment of the present disclosure. The environment 300 illustrates a data quality assessing system 101 connected through the communication network 109 to a plurality of data sources 103 and the target system 105 as shown in the FIG. 3. A person skilled in the art would understand that FIG. 3 is an exemplary embodiment and the data sources 103 may also include any other types of data sources. Further, the data quality assessing system 101 is connected to the user device $107_1$ through a communication network 111. A person skilled in the art would understand that the data quality assessing system 101 may be connected to the plurality of user devices 107. In some embodiments, the data from a data warehouse 301 and text files 303 of an organization is transferred to the target system 105. A person skilled in the art would understand that the data may also be transferred from any other and any number of different data sources. Initially, the data quality assessing system 101 compares the data at the data warehouse 301 and at the text files 303 with the corresponding data at the target system 105 and identifies the presence of the incremental heterogeneous data. On identifying the presence of incremental heterogeneous data, the data quality assessing system 101 obtains the details about the incremental heterogeneous data from respective data sources. Further, the data quality assessing system 101 determines pattern templates. The details of the incremental heterogeneous data along and the pattern templates are used for determining type of the incremental heterogeneous data. In a non-limiting environment, the type of the incremental heterogeneous data comprises structural data, semi-structural data, quasi-structural data and unstructured data. The data quality assessing system 101 determines the pattern templates by analysing user defined patterns. In some embodiments, the analysis of the user defined pattern is performed by machine learning methods. On identifying the type, the data quality assessing system 101 selects one or more data quality tests for checking quality of the incremental heterogeneous data. The data quality tests performed on the incremental heterogeneous data using user defined parameters are used to determine a score for the incremental heterogeneous data for assessing the quality. In some embodiments, the user defined parameters may be received previously and stored or may be received in real time. The scores generated against each selected one or more data quality tests are further depicted in a scoreboard and presented to the user device 107₁ as shown in FIG. 3. In some embodiments, the scoreboard may be utilized for visualizing the quality of the incremental heterogeneous data. As shown in FIG. 3, the scoreboard comprises slant line boxes, straight line boxes. Slant lines refer to no errors found, straight lines indicate certain parameters failing. In some embodiments, the scorecard provides a dashboard view where the quality parameters are mapped against each source that is scored for quality.

Figure 4:
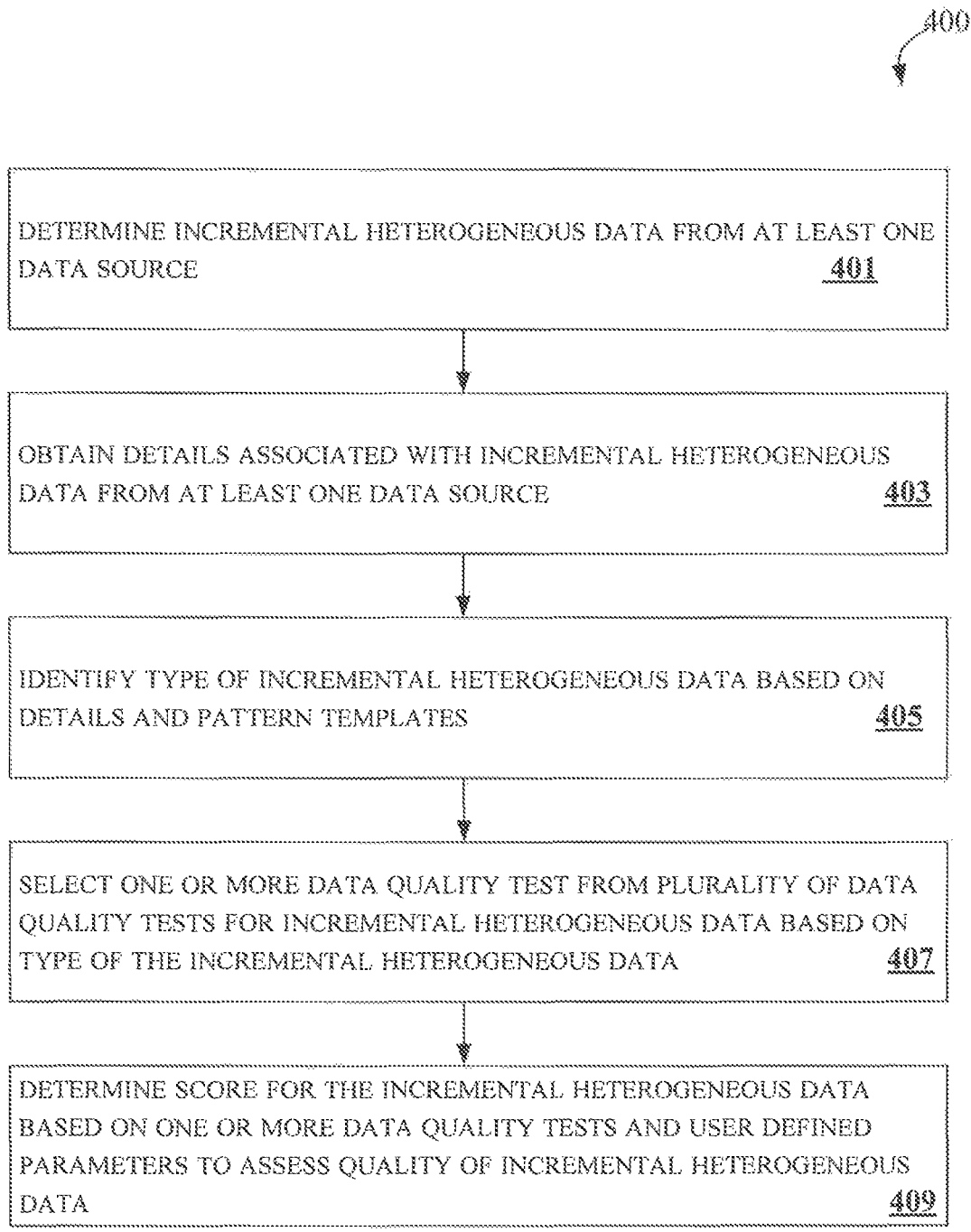
FIG. 4 illustrates a flowchart showing a method for assessing quality of incremental heterogeneous data in accordance with some embodiments of present disclosure.

FIG. 4 illustrates a flowchart showing a method for assessing quality of incremental heterogenous data in accordance with some embodiments of present disclosure.

As illustrated in FIG. 4, the method 400 comprises one or more blocks for assessing quality of incremental heterogeneous data. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

Initially, a communication link is established between the at least one data sources and the target system 105. The plurality of data sources 103 transmits data to the target system 105 at regular intervals of time.

At block 401, the data quality assessing system 101 determines an incremental heterogeneous data from at least one data source. The incremental heterogeneous data is determined by comparing data present in the at least at one data source with corresponding data transferred and stored at the target system 105. The incremental heterogenous data is identified by determining dissimilarity between data in at least one data source and corresponding data at the target system 105.

At block 403, the data quality assessing system 101 obtains details associated with the incremental heterogeneous data from the at least one data source.

At block 405, the data quality assessing system 101 identifies type of the incremental heterogeneous data based on the details and pattern templates.

At block 407, the data quality assessing system 101 selects one or more data quality tests from a plurality of data quality tests for the incremental heterogeneous data based on the identified type of the incremental heterogeneous data.

At block 409, the data quality assessing system 101 determines a score for the incremental heterogeneous data based on the one or more data quality tests and user defined parameters to assess quality of heterogeneous incremental data. The score determined against the one or more data quality tests for the incremental heterogeneous data are depicted in the scoreboard indicating the quality of the incremental heterogeneous data.

Figure 5:
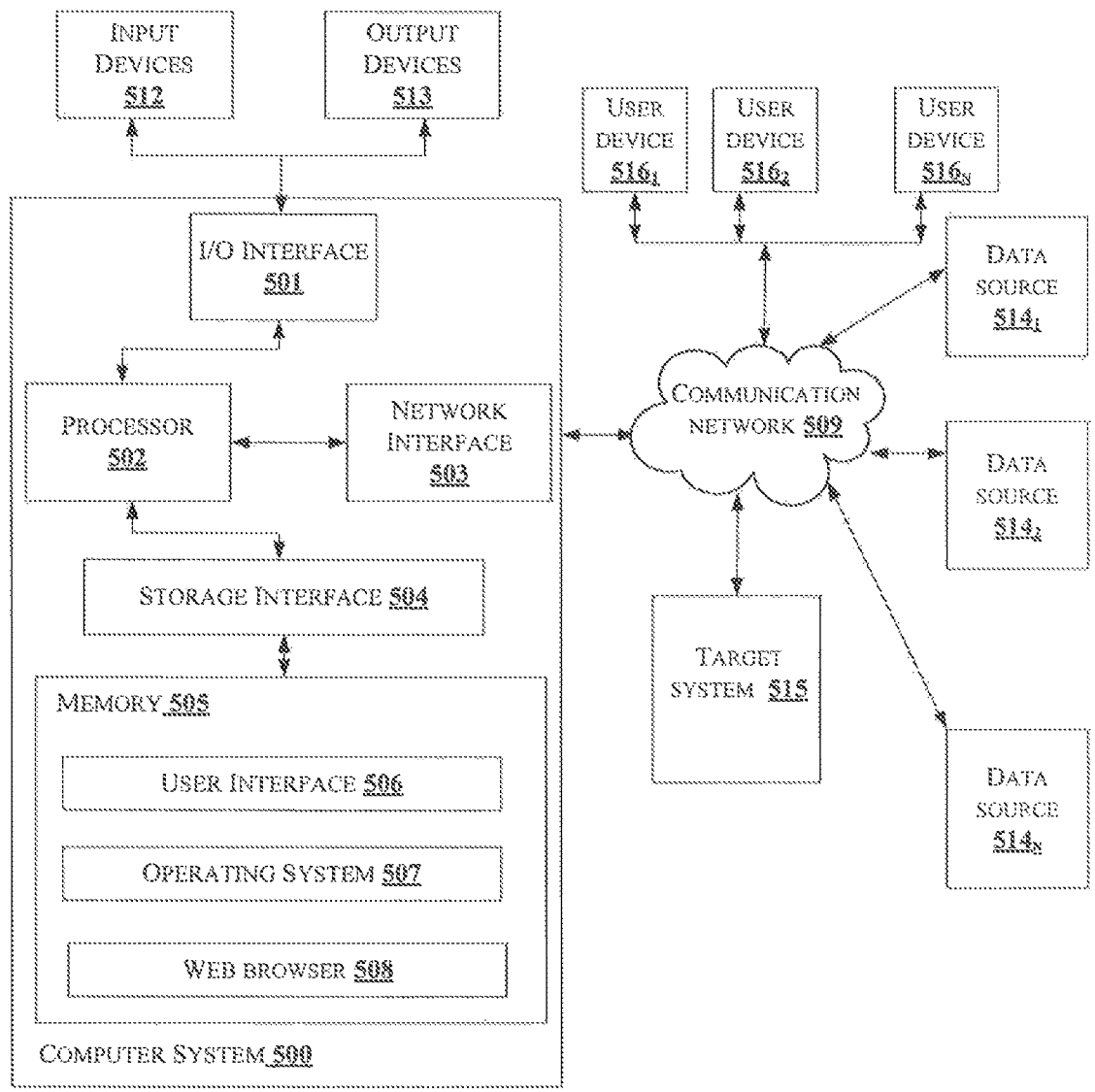
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the data quality assessing system 101. The computer system 500 may comprise a central processing unit ("CPU" or "processor") 502. The processor 502 may comprise at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVT), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of a data quality assessing system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a data source 514₁, a data source 514₂ . . . and a data source 514ₙ (collectively referred as plurality of user devices 514), a target system 515 and a user device 516₁, a user device 516₂ . . . a user device 516ₙ. (collectively referred as plurality of user device 516) The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure assesses the quality of the incremental heterogeneous data by monitoring and testing the incremental heterogenous data.

An embodiment of the present disclosure reduces the requirement of intermediate storage.

An embodiment of the present disclosure provides a system for assessing different types of the data and data from different data sources The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment". "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
|---|---|
| 100 | Environment |
| 101 | Data quality assessing system |
| 103 | Plurality of data sources |
| 105 | Target system |
| 107 | Plurality of user devices |
| 108 | Database |
| 109 | Communication network |
| 111 | Communication network |
| 113 | I/O interface |
| 115 | Memory |
| 117 | Processor |
| 200 | Data |
| 201 | Incremental data |
| 203 | Pattern template data |
| 205 | Data quality tests |
| 207 | Score data |
| 209 | Other data |
| 211 | Modules |
| 213 | Receiving module |
| 215 | Incremental data determination module |
| 217 | Information obtaining module |
| 219 | Data type identification module |
| 221 | Data quality test selection module |
| 223 | Score determination module |
| 225 | Other modules |

What is claimed is:

1. A method for assessing quality of incremental heterogeneous data, the method comprising:
   determining, by a data quality assessing system, an incremental heterogeneous data from at least one data source;
   obtaining, by the data quality assessing system, details associated with the incremental heterogeneous data from the at least one data source;
   identifying, by the data quality assessing system, type of the incremental heterogeneous data based on the details and pattern templates, wherein the pattern templates are generated automatically by analyzing user defined patterns;
   selecting, by the data quality assessing system, one or more data quality tests from a plurality of data quality tests for the incremental heterogeneous data based on the identified type of the incremental heterogeneous data; and
   determining, by the data quality assessing system, a score for the incremental heterogeneous data based on the one or more data quality tests and user defined parameters to assess quality of heterogeneous incremental data.

2. The method as claimed in claim 1, wherein the incremental heterogeneous data comprises diverse data types.

3. The method as claimed in claim 1, wherein the incremental heterogeneous data is obtained from a diverse data source.

4. The method as claimed in claim 1, wherein determining the incremental heterogeneous data comprises:
   comparing, by the data quality assessing system, data present in the least at one data source with corresponding data transferred and stored at target system; and
   determining, by the data quality assessing system, the incremental heterogeneous data by identifying dissimilarity between data present in the at least at one data source with corresponding data transferred and stored at the target system based on the comparison.

5. The method as claimed in claim 1, wherein the plurality of data quality tests comprises accessibility of source check, consistency check, timeliness check, validity check, accuracy check and non-duplicity check.

6. The method as claimed in claim 1, wherein the user defined parameters comprises priorities for data quality ranking, time criteria required for assessing the incremental data and frequency of pinging the at least one data sources.

7. The method as claimed in claim 1 further comprising generating a scoreboard representing the quality of the incremental data based on the score.

8. A data quality assessing system for assessing quality of incremental heterogeneous data comprising:
   a processor; and
   a memory communicatively coupled to the processor, wherein the memory stores processor instructions, which, on execution, causes the processor to:
      determine an incremental heterogeneous data from at least one data source;
      obtain details associated with the incremental heterogeneous data from the at least one data source;
      identify type of the incremental heterogeneous data based on the details and pattern templates, wherein the pattern templates are generated automatically by analyzing user defined patterns;

select one or more data quality tests from a plurality of data quality tests for the incremental heterogeneous data based on the identified type of the incremental heterogeneous data; and determine a score for the incremental heterogeneous data based on the one or more data quality tests and user defined parameters to assess quality of heterogeneous incremental data.

9. The data quality assessing system as claimed in claim 8, wherein the incremental heterogeneous data comprises diverse data types.

10. The data quality assessing system as claimed in claim 8, wherein the processor obtains the incremental heterogeneous data from a diverse data source.

11. The data quality assessing system as claimed in claim 8, wherein the processor determines the incremental heterogeneous data by:

comparing data present in the least at one data source with corresponding data transferred and stored at target system; and determining the incremental heterogeneous data by identifying dissimilarity between data present in the at least at one data source with corresponding data transferred and stored at the target system based on the comparison.

12. The data quality assessing system as claimed in claim 8, wherein the plurality of data quality tests comprises accessibility of source check, consistency check, timeliness check, validity check, accuracy check and non-duplicity check.

13. The data quality assessing system as claimed in claim 8, wherein the user defined parameters comprises priorities for data quality ranking, time criteria required for assessing the incremental data and frequency of pinging the at least one data sources.

14. The data quality assessing system as claimed in claim 8, wherein the processor generates a scoreboard representing the quality of the incremental data based on the score.

15. A non-transitory computer readable medium including instructions stored thereon that when processed by at least one processor cause a data quality assessing system to perform operations comprising:

determining an incremental heterogeneous data from at least one data source;

obtaining details associated with the incremental heterogeneous data from the at least one data source;

identifying type of the incremental heterogeneous data based on the details and pattern templates, wherein the pattern templates are generated automatically by analyzing user defined patterns;

selecting one or more data quality tests from a plurality of data quality tests for the incremental heterogeneous data based on the identified type of the incremental heterogeneous data; and determining a score for the incremental heterogeneous data based on the one or more data quality tests and user defined parameters to assess quality of heterogeneous incremental data.

16. The medium as claimed in claim 15, wherein the incremental heterogeneous data comprises diverse data types.

17. The medium as claimed in claim 15, wherein the instruction causes the processor to obtain the incremental heterogeneous data from a diverse data source.

18. The medium as claimed in claim 15, wherein the instruction causes the processor to determine the incremental heterogeneous data by:

comparing data present in the least at one data source with corresponding data transferred and stored at target system; and determining the incremental heterogeneous data by identifying dissimilarity between data present in the at least at one data source with corresponding data transferred and stored at the target system based on the comparison.

19. The medium as claimed in claim 15, wherein the plurality of data quality tests comprises accessibility of source check, consistency check, timeliness check, validity check, accuracy check and non-duplicity check.

20. The medium as claimed in claim 15, wherein the user defined parameters comprises priorities for data quality ranking, time criteria required for assessing the incremental data and frequency of pinging the at least one data sources.

21. The medium as claimed in claim 15, wherein the instruction causes the processor to generate a scoreboard representing the quality of the incremental data based on the score.

* * * * *